US010755363B2

(12) United States Patent
Chan et al.

(10) Patent No.: US 10,755,363 B2
(45) Date of Patent: Aug. 25, 2020

(54) AUGMENTED REVIEWS WITH COGNITIVE REASONING

(71) Applicant: INTERNATIONAL BUSINESS MACHINES CORPORATION, Armonk, NY (US)

(72) Inventors: Yuk L. Chan, Rochester, NY (US); Heidi Lagares-Greenblatt, Jefferson Hills, PA (US); Jenny S. Li, Danbury, CT (US); Deepti M. Naphade, Cupertino, CA (US); Xinlin Wang, Irvine, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 541 days.

(21) Appl. No.: 15/206,619

(22) Filed: Jul. 11, 2016

(65) Prior Publication Data
US 2018/0011881 A1    Jan. 11, 2018

(51) Int. Cl.
*G06Q 50/00* (2012.01)
*G06Q 30/02* (2012.01)
*G06F 16/958* (2019.01)

(52) U.S. Cl.
CPC .......... *G06Q 50/01* (2013.01); *G06F 16/958* (2019.01); *G06Q 30/0278* (2013.01)

(58) Field of Classification Search
CPC ............. G06F 17/241; G06F 17/30303; G06F 17/3056; G06F 16/958; G06Q 50/01; G06Q 30/0278
USPC ......................................................... 707/722
See application file for complete search history.

(56) References Cited

U.S. PATENT DOCUMENTS

| 9,092,784 | B2 | 7/2015 | Proudfoot | |
|---|---|---|---|---|
| 9,710,790 | B2* | 7/2017 | Taylor | G06Q 10/1053 |
| 2001/0021994 | A1* | 9/2001 | Nash | H04H 20/106 |
| | | | | 725/42 |
| 2008/0016211 | A1* | 1/2008 | Hillary | G06Q 30/02 |
| | | | | 709/224 |
| 2009/0119258 | A1* | 5/2009 | Petty | G06Q 10/10 |
| | | | | 707/999.003 |
| 2009/0164402 | A1* | 6/2009 | Yahia | G06N 5/022 |
| | | | | 706/46 |
| 2009/0164929 | A1* | 6/2009 | Chen | G06F 16/9535 |
| | | | | 715/769 |
| 2013/0144802 | A1* | 6/2013 | Bank | G06Q 30/02 |
| | | | | 705/347 |
| 2013/0226674 | A1* | 8/2013 | Field | G06Q 50/20 |
| | | | | 705/7.38 |

(Continued)

OTHER PUBLICATIONS

Manh Cuong Pham et al, "A Clustering Approach for Collaborative Filtering Recommendation Using Social Network Analysis", Journal of Universal Computer Science, vol. 17, No. 4 (2011), pp. 583-604.

(Continued)

*Primary Examiner* — Phong H Nguyen
(74) *Attorney, Agent, or Firm* — Cantor Colburn LLP; Teddi Maranzano

(57) ABSTRACT

A method for augmenting a review. The method includes accessing a review database and a particular review of an object. Providing a reviewer profile including a plurality of reviewer attributes and analyzing the reviewer attributes to determine a rationale for the review.

19 Claims, 6 Drawing Sheets

(56) References Cited

U.S. PATENT DOCUMENTS

| | | |
|---|---|---|
| 2013/0290142 A1 | 10/2013 | Croes |
| 2014/0172744 A1 | 6/2014 | El-Hmayssi et al. |
| 2014/0195931 A1 | 7/2014 | Kwon et al. |
| 2015/0199646 A1* | 7/2015 | Taylor ................ G06Q 10/1053 705/321 |
| 2015/0262264 A1* | 9/2015 | Appel .................... G06Q 50/01 705/347 |
| 2015/0278917 A1* | 10/2015 | Stoll .................. G06Q 30/0631 705/26.7 |
| 2018/0268495 A1* | 9/2018 | O'Connor .............. G06Q 50/01 |

OTHER PUBLICATIONS

Nikolaos Korfiatis et al., "Using online consumer reviews as a source for demographic recommendations: A case study using online travel reviews", Expert Systems with Applications 40 (2013) pp. 5507-5515.

* cited by examiner

AUGMENTED REVIEWS WITH COGNITIVE REASONING

BACKGROUND

Ratings and reviews are often based on the content of a social network post or feedback. Sometimes these ratings or reviews are not suitable or useful because information is not provided for explaining the rationale for the ratings or reviews. This is especially true when only a few reviews are provided or they represent an outlier from the median rating. Consequently, there is a need to provide substantive background to the rationale for the review.

SUMMARY

In accordance with one or more embodiments, a computer-implemented method for augmenting a review is provided. The method includes accessing using a processor system a review database having a plurality of review data records. The processor system provides a review data record for an object by a reviewer from the review database. The review data record is displayed using a display. The processor system provides a reviewer profile which includes a plurality of reviewer attributes. The processor system analyzes the reviewer attributes to determine a rationale for the review. The rationale for the review is displayed using a display.

In one or more embodiments of the invention, a system for augmenting a review includes a plurality of object review data records provided by a plurality of reviewers regarding an object, wherein the plurality of reviewers have associated reviewer attributes. The records are stored in memory. A processor is configured to analyze the reviewer attributes of a predetermined reviewer to determine a rationale for a predetermined object review by the review. The processor utilizes a display for displaying the rationale for the review.

In accordance with one or more embodiments, a computer program product for augmenting a review is provided. The computer program product includes a computer-readable storage medium having program instructions embodied therewith, wherein the computer readable storage medium is not a transitory signal per se. The program instructions are readable by a processing circuit to cause the processing circuit to perform a method. The method includes accessing, using the processing circuit, a review database. A review of an object by a reviewer is provided from the review database. The review is displayed using a display. A reviewer profile having a plurality of reviewer attributes is analyzed by the processing circuit to determine a rationale for the review. The rationale is displayed.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

One or more embodiments of the present disclosure present an augmented review with a cognitive reasoning system and method. Embodiments allow for an individual to inquire regarding the rationale of a particular review which a reviewer has submitted for an object which may be a product or a service. In one or more embodiments, the disclosed augmented review system and method access and analyze the particular attributes of an individual who has submitted the review to analyze the particular characteristics of the individual and how it may impact the reviewer's particular biases or objectivity. In one or more embodiments, methods and systems for providing an augmented review are provided, which may include providing additional individual attributes from accessible databases which may contain information regarding the reviewer.

More specifically, one or more embodiments of the present invention provide an augmented review based on a query submitted by an end user regarding the reviewer, and further based on additional parameters such as the reviewer's personal attributes and prior reviews which may be compared with attributes of the subject matter of the product or service being reviewed.

Figure 1:
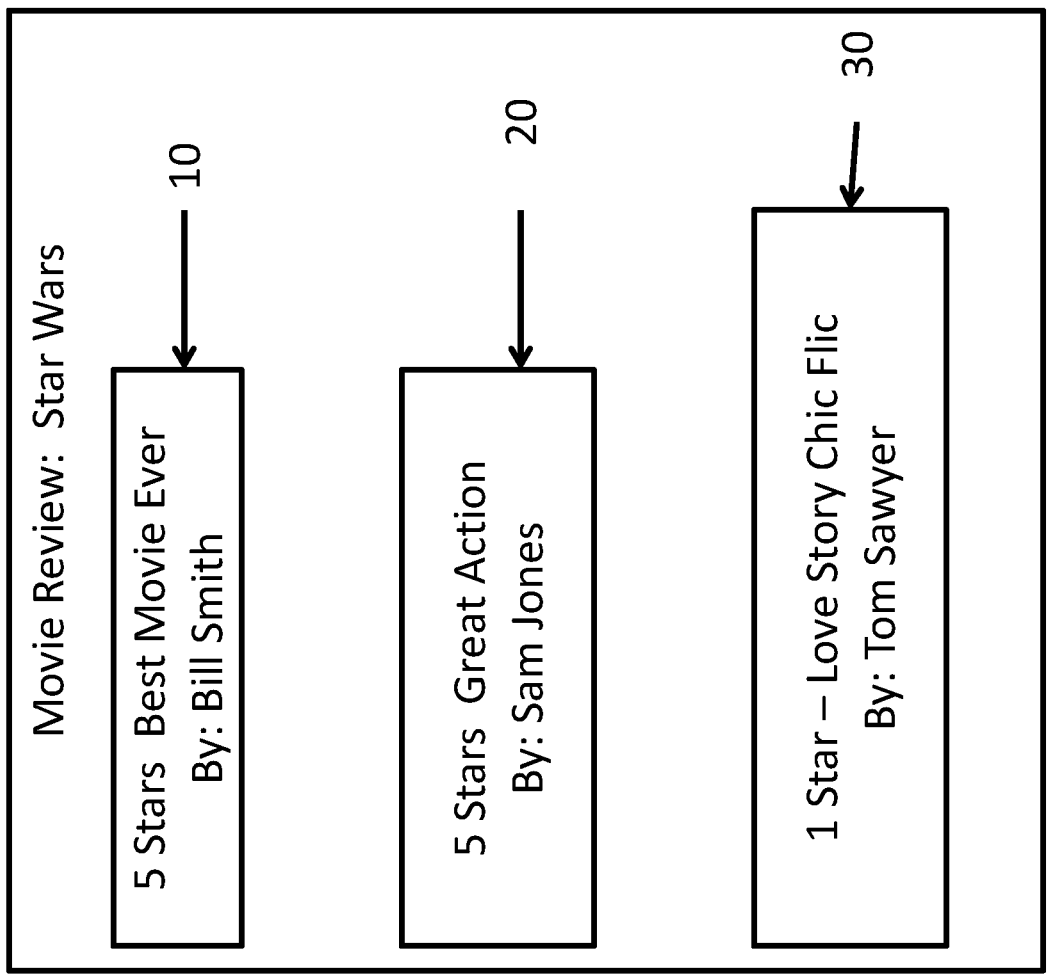
FIG. 1 shows a plurality of review data records according to one or more embodiments.

Turning now to a more detailed description of the present disclosure there is shown in FIG. 1 a plurality of review records for the movie Star Wars. Review record 10 is provided by a reviewer Bill Smith who has given the movie five stars, out of a maximum of five, and provided a comment "best movie ever". Review record 20 is provided by reviewer Sam Jones who has also given the movie a five-star rating and provided a comment "great action". Review record 30 is provided by reviewer Tom Sawyer 30 who has given the movie a one-star rating and commented "Love Story, Chic Flic". Tom Sawyer's review is an outlier and having knowledge of this reviewer's personal attributes may assist in augmenting the rationale for the one-star rating.

Figure 2:
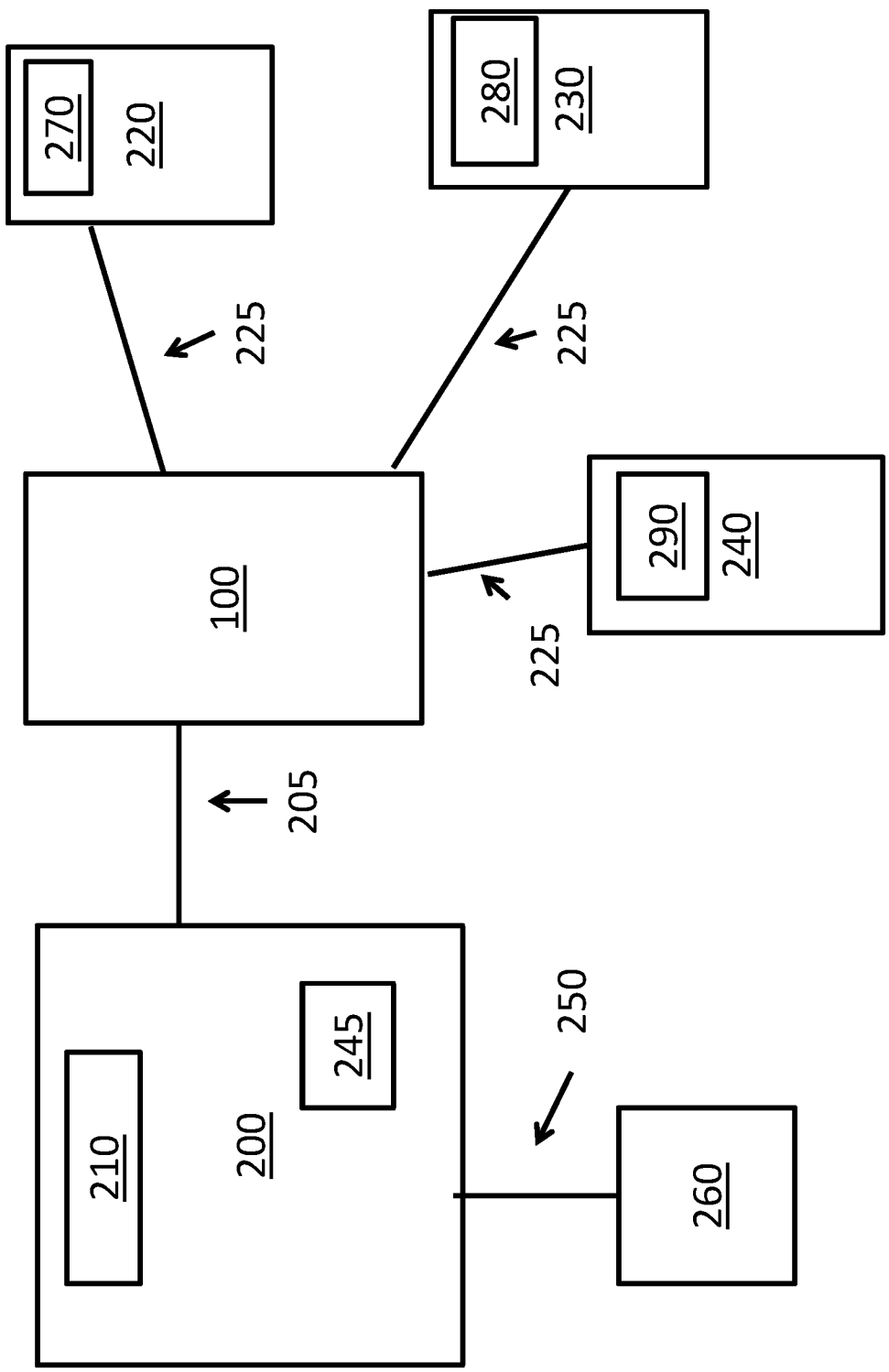
FIG. 2 is a block diagram illustrating one example of an augmented review system for practice of the teachings herein.

As shown in FIG. 2 user device 260 interfaces with a web-based application 200 which utilizes a plurality of review data files 210 and affiliated reviewer records 245. User device 260 communicates with web-based application 200 via communications network 250. User device 260 may be any type of computing device capable of submitting a reviewer query. Such devices include a desktop computer, a laptop mobile computer, a personal data assistant, a mobile phone, a tablet computer and the like with wired or wireless communication capabilities for communication with a communication network. Each user device may include a user interface such as a screen, a keyboard, touchpad, or microphone. Communication network 250 may be any type of electronic communications network such as a local area network, a personal area network, a home area network, a wide area network, a campus network, an enterprise private network, an internetwork, a backbone network, a global area network, the internet, an intranet, and/or the like and/or a combination of two or more. The user device may communicate with augmented review system 100 indirectly via web-based application 200 from anywhere and anytime via the communication network 205. Augmented review system 100 may also be integrated with web-based application 200.

In an embodiment, augmented review system 100 also communicates with a plurality of remote databases 220, 230, and 240 via communication network 225. Communication network 225 may be similar to communication network 205. Remote databases 220, 230, and 240 include reviewer records 270, 280 and 290 respectively which include the names of individuals and associated personal characteristics which are accessed by augmented review recommendation system 100 to provide an augmented review of review record 210. For example, database 220 may be affiliated with an e-commerce merchant and affiliated reviewer record 270 may contain an identification of the user's prior purchases on the website, or may contain a profile of the reviewer which may include certain reviewer attributes such as location, gender, marital status, income level and the like. Reviewer record 270 may also contain prior reviews of products purchased via the e-commerce merchant site. Database 230 may be affiliated with a social network and affiliated reviewer record 280 may contain an identification of the user's location, and text posts by the reviewer which may be accessed and translated by a text translation system. Database 240 may be a web-based entertainment site and affiliated reviewer record 290 may contain a profile of the reviewer which may include certain reviewer attributes such as favorite movie genres, hobbies, and prior reviews. In certain situations, certain reviewers are identified as certified or other recognition which identifies the reviewer as being an individual who provides well thought out and accurate reviews in addition to providing numerous reviews. These individuals generally are required to provide detailed background information to authenticate their certification versus the random individual who posts infrequently. Databases 220, 230 and 240 may be accessed by augmented review system 100 if the affiliated reviewer records 245 do not provide sufficient reviewer attribute data for providing an augmented review.

Figure 3:
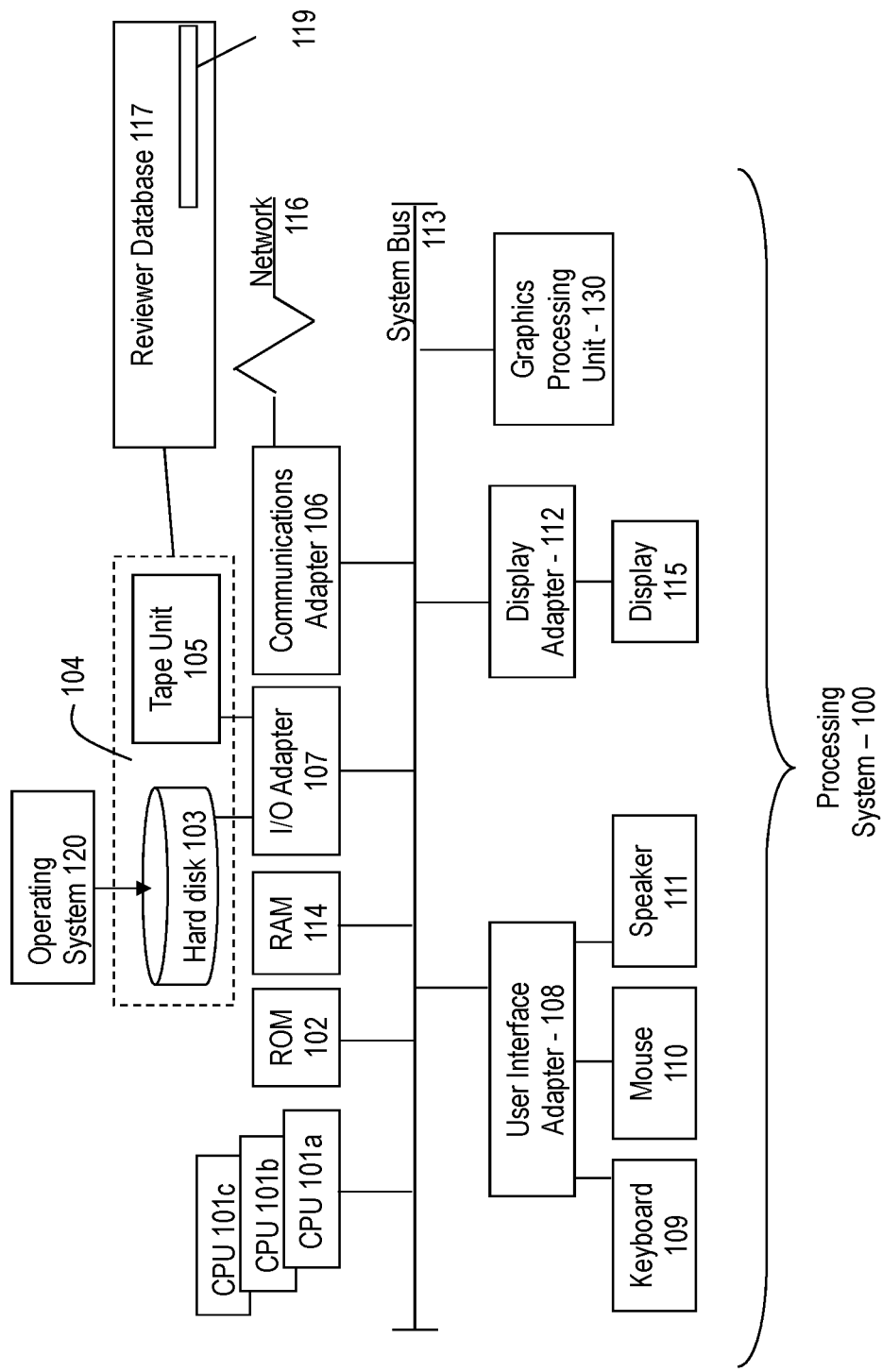
FIG. 3 shows a block diagram illustrating one example of an augmented review system for practice of the teachings herein.

Referring to FIG. 3, there is shown an augmented review system 100 according to one or more embodiments. The system 100 has one or more central processing units (processors) 101*a*, 101*b*, 101*c*, etc. (collectively or generically referred to as processor(s) 101). In one or more embodiments, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling log management system 100 to communicate with other such systems. A screen (e.g., a display monitor) 115 is connected to system bus 113 by display adaptor 112, which may include a graphics adapter to improve the performance of graphics intensive applications and a video controller. In one or more embodiments, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit. A reviewer database 117 contains reviewer profile records 119. Reviewer database 117 is associated with mass storage 104 for storing data records containing information collected from databases 220, 230 and 240 or affiliated reviewer records 245.

Thus, as configured in FIG. 3, the augmented review system 100 includes processing capability in the form of processors 101, storage capability including the system memory 114 and mass storage 104, input means such as keyboard 109 and mouse 110, and output capability including speaker 111 and display 115. In one or more embodiments, a portion of system memory 114 and mass storage 104 collectively store an operating system to coordinate the functions of the various components shown in FIG. 3.

In exemplary embodiments, the augmented review system may retrieve the reviewer's attributes which are dedicated to the review which is being augmented. For instance, if the review in question is a movie review on a particular website hosting movie reviews, it is common that the reviewer will have previously established a profile on that particular website identifying certain characteristics of the reviewer such as gender, favorite movie types, likes and dislikes, location, marital status, frequency of movie watching, average review score and the like. Additionally, prior reviews of the user may be evaluated to determine if the reviewer typically provides a rating of a movie within the mean of others reviewing the particular movie or typically provides outlier ratings. In an additional embodiment, augmented review system 100 accesses databases 220, 230 and 240 to obtain data records 270, 280 and 290 which contain the reviewer's attributes. Augmented review system 100 searches or mines the respective databases for data files associated with the reviewer whose review is being augmented. Certain databases searched may include commercial merchant sites, social websites, and professional websites. The augmented review system includes visual data analysis capabilities, textual data analysis capabilities as well as data mining capabilities utilizing speech recognition technology. Such technology is provided by IBM® Watson® language services including language translation and speech services. The analyzed data records are stored in reviewer database 117 which is associated with system memory 104.

Figure 4:
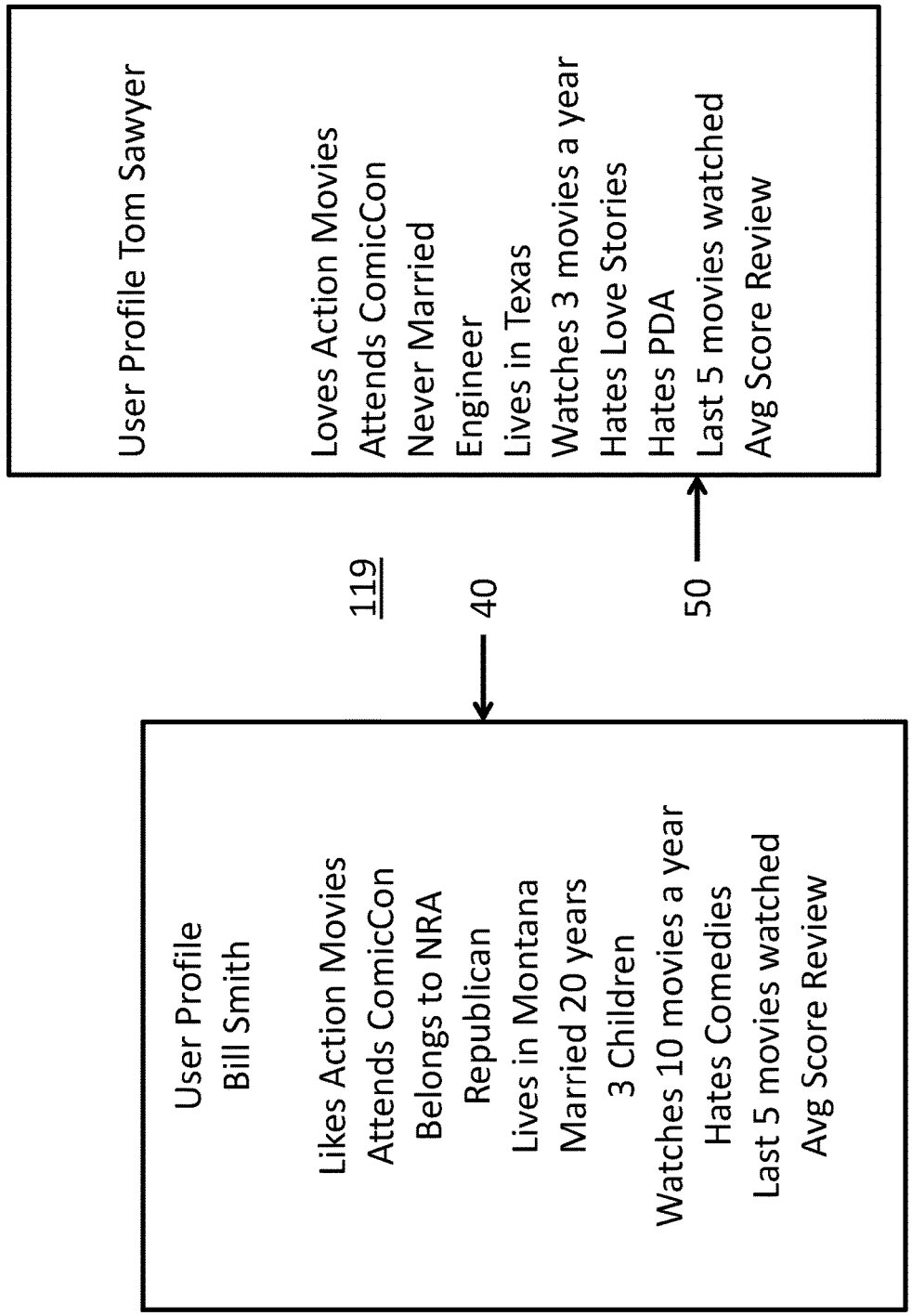
FIG. 4 shows a reviewer profile and attributes utilized for providing an augmented review for practice of the teachings herein.

As shown in FIG. 4, reviewer profiles 40 and 50 are data records 119 which may associate directly with a respective web-based application 200 or compiled by augmented processing system 100 and stored in reviewer database 117. Reviewer profiles 40 and 50 respectively illustrate examples of reviewer attributes which are utilized for providing an augmented review. Reviewer profile 40 illustrates a reviewer profile of Bob Smith which identifies that this reviewer likes action movies, attends ComicCon, belongs to the NRA, is a republican, lives in Montana, is married for 20 years, has three children, watches ten movies a year, hates comedies, the last five movies he has watched and the average score review he provides. Reviewer profile 50 illustrates a reviewer profile of Tom Sawyer which identifies that this reviewer loves action movies, attends ComicCon, has never been married, is an engineer, lives in Texas, watches only three movies a year, hates loves stories, hates public display of affection, the last five movies he watched and his average score review. These examples of reviewer attributes are analyzed to provide an augmented review if necessary for these respective reviewers. The reviewer attributes shown are merely a simple example for illustrative purposes.

Figure 5:
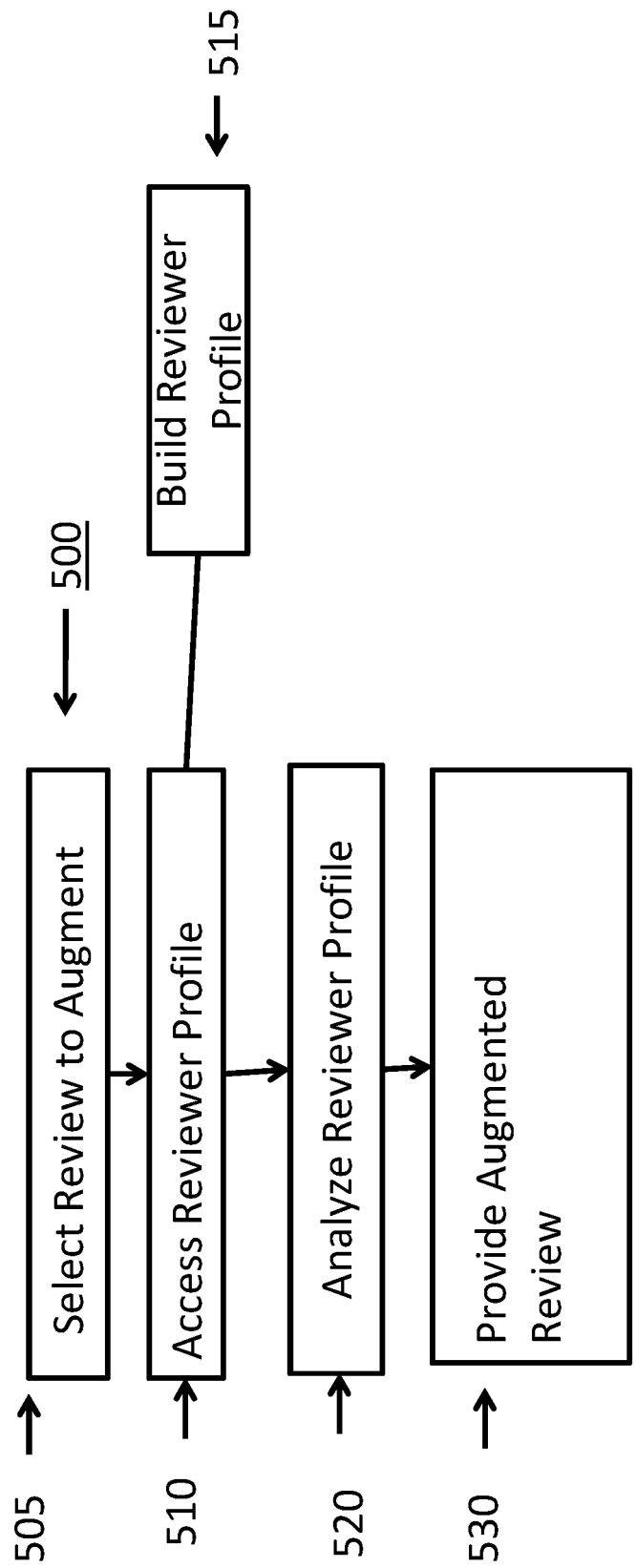
FIG. 5 shows the analysis of a reviewer profile and attributes for providing an augmented review for practice of the teachings herein.

FIG. 5 illustrates a method for providing an augmented review 500. Initially, an object such as a movie or a product is retrieved by an end user and respective reviews by prior reviewers are produced for the end user to read. As shown at block 505, the end user selects a particular review to augment. The review may be based on a rating system and the review may be analyzed to determine if the rating provided with the associated review is an outlier from other prior reviews and the end user would like to augment the review to determine if the review while an outlier is accurate from that reviewer's perspective, or in an additional embodiment, the particular review may have limited information associated with it and the end user would like to augment the particular review. Based on the review which is selected by the end user, at block 510, the reviewer profile is accessed which identifies the respective reviewer attributes associated with the reviewer. The reviewer profile may be associated directly with the particular site which the end user is accessing, such as a movie review website, or an e-commerce website with affiliated products or the augmented review system may retrieve the respective reviewer attributes from external websites and build the reviewer profile at block 515. As shown at block 520, the respective reviewer profile with the corresponding reviewer attributes is analyzed to provide an augmented review of the initial review selected at block 530.

Figure 6:
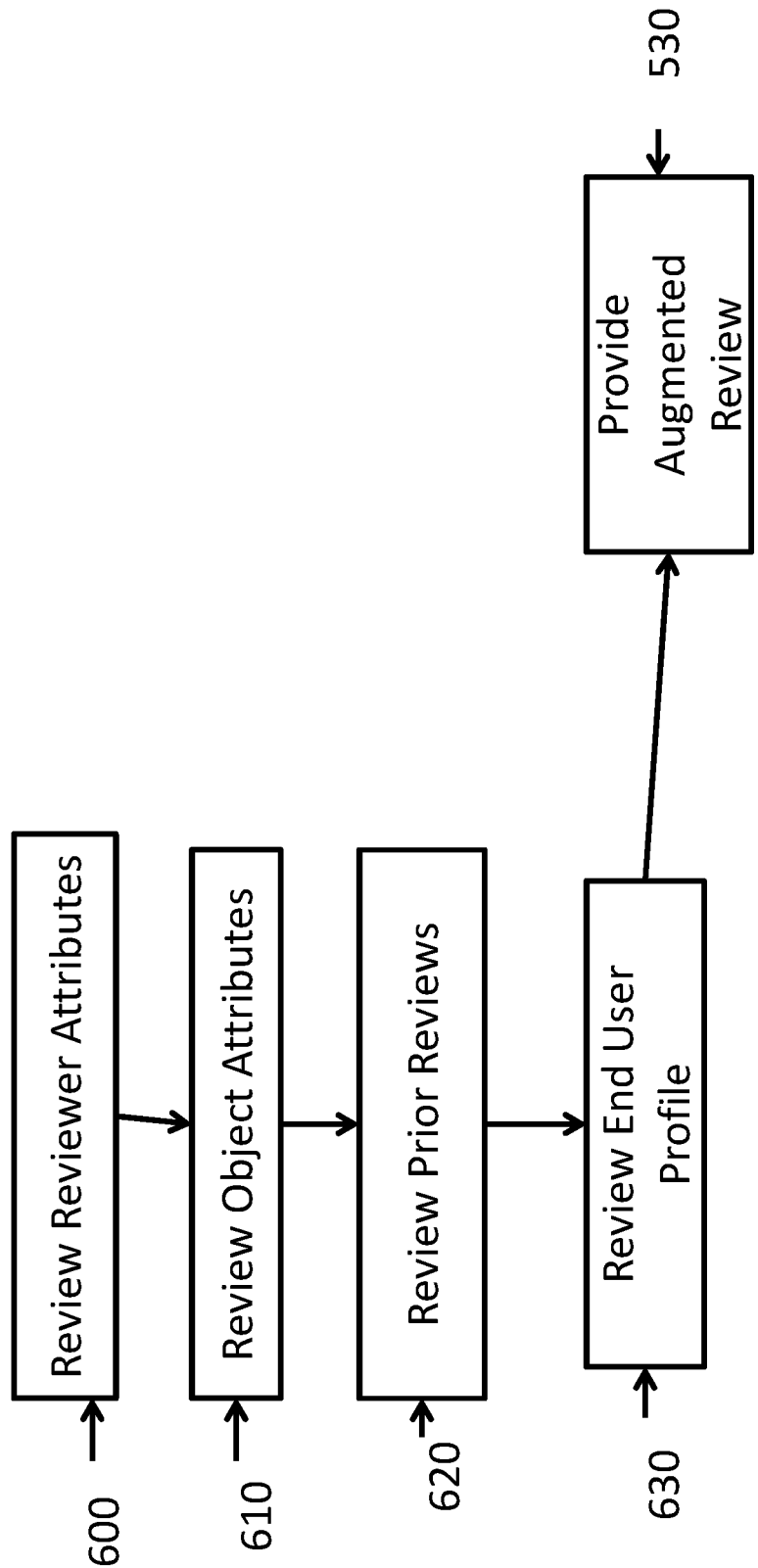
FIG. 6 shows a method of providing an augmented review according to the teachings herein.

FIG. 6 illustrates an example of the provision of an augmented review of the initial review, as shown in block 520 of FIG. 5. At block 600, the respective review attributes are analyzed to provide background information on the respective reviewer and assess the likes and dislikes of the particular reviewer and the reviewer's tendencies in providing reviews. At block 610, the particular attributes of the object being reviewed may be considered. For instance, if the object being reviewed was a movie, then the movie may have certain characteristics such as the respective genre, plot, settings, violence, public display of affection, and other characteristics. If the object being reviewed was a product, then the product may have certain attributes such as intended use, expected life of the product, size, ease of assembly, and other attributes. At block 610 the attributes of the particular object may be reviewed in conjunction with the reviewer attributes to provide an augmented review. For instance, if one of the objects attributes indicated that the movie was extremely violent and the reviewer attributes indicated that the reviewer did not like violence in movies, then the augmented review would identify the potential conflict and possible reason for a lower than average review. Additionally at block 620, prior reviews from the reviewer may be evaluated to determine if the reviewer has certain tendencies and consistently reviews provides objects similar ratings. An additional step at block 630 may be conducted when the end user provides a personal profile which identifies certain attributes of the end user. These attributes may be compared with the reviewer attributes to determine of the individuals have certain similarities which may be utilized to augment the initial review by discussing the similarities of the user and reviewer profiles. Based on the similarities, reviews can be filtered or sorted to simplify navigation and selection of relevant reviews. As an example, users that are anti-violence could look for reviewers that are also anti-violence. As another example, users that are looking for violence movies could look for reviewer that loved violence movies, and gave bad rating to the current movie under review. As another example, users can remove reviews belonging to reviewers that support violence.

Based on the reviewer attributes and additional information, an augmented review is provided. For example, as shown in FIG. 1, reviewer Tom Sawyer provided a one-star rating for the movie Star Wars while the other reviewers gave the movie a five-star rating out of five stars. In this example, Tom Sawyer's review is an outlier and the end user would like to augment this review to have a better understanding of why Tom Sawyer provided such a low rating. As shown in FIG. 5, the reviewer profile of Tom Sawyer provides reviewer attributes which identifies that Tom Sawyer has never been married, hates loves stories, and hates all types of public display of affection. Additional information from prior movie watched may identify that Tom Sawyer always gives one rating to any movie which has any form of a love story. This information is evaluated and an augmented review may be provided which states that this reviewer Tom Sawyer's rating is probably based on his particular disdain for any form of a love story notwithstanding any additional characteristic of the movie and that Tom Sawyer typically gives a one-star rating to such movies. Additionally, Tom Sawyer's review may be augmented utilizing the attributes of the object. The attributes for this movie may include science fiction, action, violence, romance, love story, good vs. evil, hero, and the like. These attributes may be provided to augment the review and the end user may determine that the movie contains a romantic theme and given the reviewer attributes of Tom Sawyer and his consistent low rating for any movie with a romantic theme, the end user has a better understanding of the lower rating.

In certain embodiments, a display is utilized for displaying respective information to the end user. The end user may select a particular review which is displayed for being augmented. The selection may result in an informational overlay being presented on the display which presents information related to the respective reviewer. This information may include the respective reviewer attributes, prior reviews by the reviewer, or the actual augmented review.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for augmenting a review, the method comprising:
   accessing, using a processing system, a review database;
   providing, using the processing system, a first review of an object by a first reviewer from the review database;
   providing, using the processing system, a first reviewer profile of the first reviewer, the first reviewer profile including a plurality of first reviewer attributes;
   providing, using the processing system, a second review of the object by a second reviewer from the review database;
   providing, using the processing system, a second reviewer profile of the second reviewer, the second reviewer profile including a plurality of second reviewer attributes;
   providing, using the processing system, an end user profile of an end user, the end user profile including an end user attribute;
   determining, using the processing system, a similarity between the end user attribute and an attribute of the plurality of first reviewer attributes;
   in response to determining the similarity, analyzing, using the processing system, the plurality of first reviewer attributes and generating, by the processing system, a best guess of the first reviewer's rationale for the first review, the best guess based on an identified conflict between one or more attributes of the first reviewer and an attribute of the object;

generating an augmented review comprising the first review and a textual explanation of the best guess and the identified conflict; and displaying, in response to a selection of the first review by the end user, the augmented review to the end user.

2. The computer-implemented method of claim 1 further comprising obtaining reviewer attributes from one or more databases accessible from the internet or proprietary databases.

3. The computer-implemented method of claim 1 further comprising providing, using the processing system, prior reviews by the first reviewer and displaying the prior reviews using the display.

4. The computer-implemented method of claim 1 wherein the object reviewed is a movie.

5. The computer-implemented method of claim 4 wherein the first reviewer attributes are selected from the group comprising gender, memberships, movie genre, hobbies, marital status, and prior movie reviews.

6. The computer-implemented method of claim 5 wherein a review is based upon a rating system and a plurality of movie reviews by a plurality of reviewers are analyzed by the processor to determine a mean rating, and wherein a predetermined review having a rating is compared to the mean rating to determine if the predetermined review is an outlier.

7. The computer-implemented method of claim 1 wherein an informational overlay is displayed displaying the first reviewer attributes.

8. The computer-implemented method of claim 1 wherein the object is associated with object attributes and determining the rationale for the first review includes analyzing, using the processing system, the first reviewer attributes in conjunction with the object attributes.

9. The computer-implemented method of claim 1 wherein the object is a product or service.

10. A system for providing a rationale for a review, the system comprising:

a memory; and a processing system communicatively coupled to the memory, the processing system including a display;

wherein the memory is configured to store a plurality of object reviews provided by a plurality of reviewers regarding an object, wherein the plurality of reviewers have associated reviewer attributes;

wherein the processing system is configured to:

access a review database;

provide a first review of an object by a first reviewer from the review database;

provide a first reviewer profile of the first reviewer, the first reviewer profile including a plurality of first reviewer attributes;

provide a second review of the object by a second reviewer from the review database;

provide a second reviewer profile of the second reviewer, the second reviewer profile including a plurality of second reviewer attributes;

provide an end user profile of an end user, the end user profile including an end user attribute;

determine a similarity between the end user attribute and an attribute of the plurality of first reviewer attributes;

in response to determining the similarity, analyze the plurality of first reviewer attributes and generate a best guess of the first reviewer's rationale for the first review, the best guess based on an identified conflict between one or more attributes of the first reviewer and an attribute of the object;

generate an augmented review comprising the first review and a textual explanation of the best guess and the identified conflict; and display, in response to a selection of the first review by the end user, the augmented review to the end user.

11. The system of claim 10 wherein the processing system obtains reviewer attributes from databases accessible from the internet or proprietary databases.

12. The system of claim 10 further including providing, using the processing system, prior reviews by the reviewer and displaying the reviews using the display.

13. The system of claim 10 wherein the object reviewed is a movie.

14. The system of claim 10 wherein a plurality of object reviews by a plurality of reviewers are analyzed by the processor to determine a mean rating, and wherein a predetermined review having a rating is compared to the mean rating to determine if the predetermined review is an outlier.

15. The system of claim 10 wherein an informational overlay is displayed that includes the reviewer attributes.

16. The system of claim 10 wherein the object is associated with object attributes and wherein the rationale for the review includes using the processing system to associate the reviewer attributes in conjunction with the object attributes.

17. A computer program product for augmenting a review, the computer program product comprising a computer readable storage medium having program instructions embodied therewith, wherein the computer readable storage medium is not a transitory signal per se, the program instructions readable by a processing circuit to cause the processing circuit to perform a method comprising:

accessing, using a processing circuit, a review database;

providing, using the processing circuit, a first review of an object by a first reviewer from the review database;

providing, using the processing circuit, a first reviewer profile of the first reviewer, the first reviewer profile including a plurality of first reviewer attributes;

providing, using the processing circuit, a second review of the object by a second reviewer from the review database;

providing, using the processing circuit, a second reviewer profile of the second reviewer, the second reviewer profile including a plurality of second reviewer attributes;

providing, using the processing circuit, an end user profile of an end user, the end user profile including an end user attribute;

determining, using the processing circuit, a similarity between the end user attribute and an attribute of the plurality of first reviewer attributes;

in response to determining the similarity, analyzing, using the processing circuit, the plurality of first reviewer attributes and generating, by the processing circuit, a best guess of the first reviewer's rationale for the first review, the best guess based on an identified conflict between one or more attributes of the first reviewer and an attribute of the object;

generating an augmented review comprising the first review and a textual explanation of the best guess and the identified conflict; and displaying, in response to a selection of the first review by the end user, the augmented review using a display.

18. The computer program product of claim 17 further including providing, using the processing circuit, prior reviews by the first reviewer and displaying the prior reviews using a display.

19. The computer program product of claim 17 wherein the object is associated with object attributes and the step of determining the rationale for the first review includes the step of analyzing, using the processing circuit, the first reviewer attributes in conjunction with the object attributes.

* * * * *